W. F. BRIEN AND M. H. WHITTAKER.
ROUTE AND STATION INDICATING MEANS.
APPLICATION FILED JAN. 21, 1918.
1,310,978.
Patented July 22, 1919.
2 SHEETS—SHEET 1.
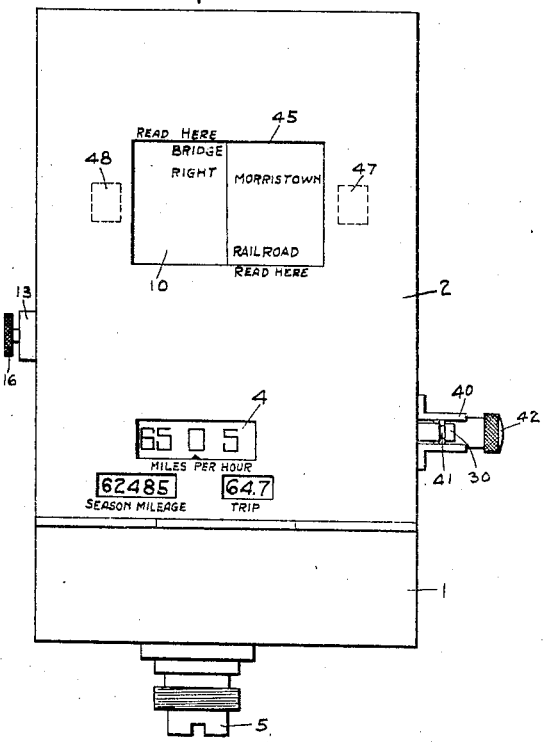
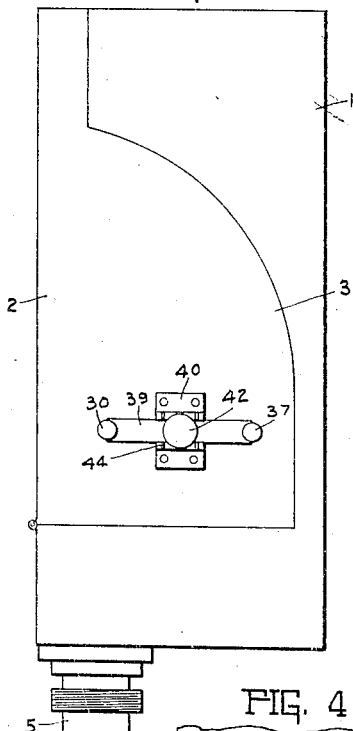
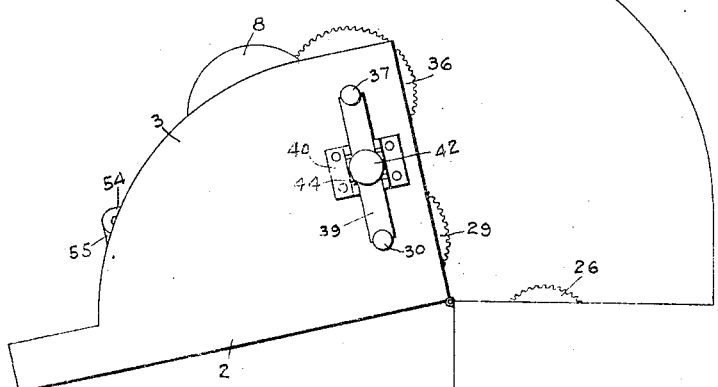
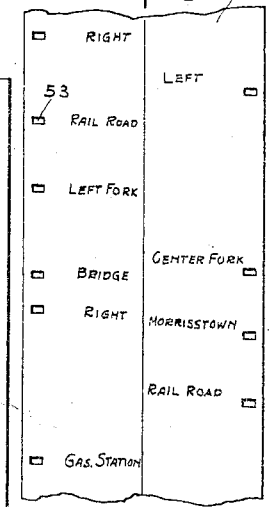
INVENTORS
MARVIN H. WHITTAKER
AND
WILLIAM F. BRIEN.
BY
ATTORNEYS W. F. BRIEN AND M. H. WHITTAKER.
ROUTE AND STATION INDICATING MEANS.
APPLICATION FILED JAN. 21, 1918.
1,310,978.
Patented July 22, 1919.
2 SHEETS—SHEET 2.
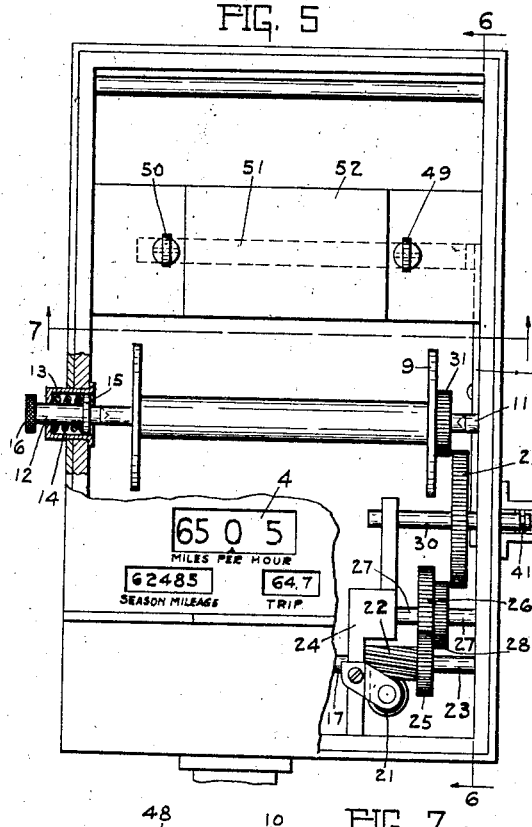
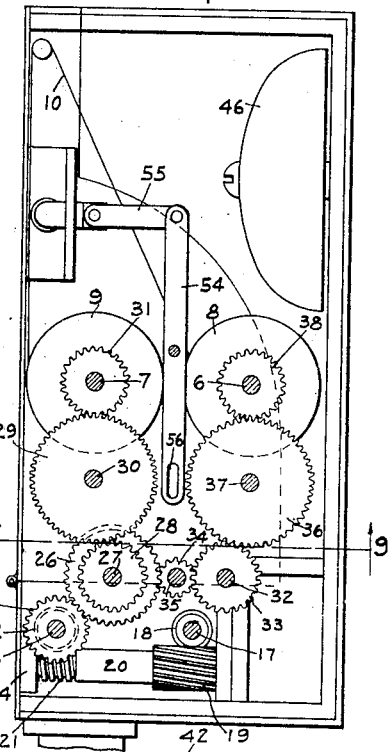
INVENTORS
MARVIN H. WHITTAKER
AND
WILLIAM F. BRIEN.
BY
Lockwood & Lockwood
ATTORNEYS

UNITED STATES PATENT OFFICE.

WILLIAM F. BRIEN AND MARVIN H. WHITTAKER, OF INDIANAPOLIS, INDIANA.

ROUTE AND STATION INDICATING MEANS.

1,310,978.  Specification of Letters Patent.  Patented July 22, 1919.

Application filed January 21, 1918. Serial No. 212,968.

*To all whom it may concern:*

Be it known that we, WILLIAM F. BRIEN and MARVIN H. WHITTAKER, citizens of the United States, and residents of Indianapolis, county of Marion, and State of Indiana, have invented a certain new and useful Route and Station Indicating Means; and we do hereby declare that the following is a full, clear, and exact description thereof, reference being had to the accompanying drawings, in which like letters refer to like parts.

This invention relates to route and station indicating means and one of the features of the invention is the provision of a tape having printed instructions thereon for directing the course of travel, such tape having two columns for giving instructions, one column giving instructions while traveling from one point to another, and the other column giving instructions when traveling on the return trip, or from the second destination to the original starting point.

A further feature of the invention is means controlled by the operation of the usual or any preferred form of speedometer for moving the tape lengthwise to successively exhibit the different directions through an observation opening in the case containing the tape.

A further feature of the invention is the provision of means for reversing the rotation of the tape winding mechanism without disturbing the rotation of the parts of the driving means. A further feature of the invention is the provision of a casing having a hinged portion to which the tape operating mechanism is attached so that when the hinged portion is swung to open position, free access may be had for changing the tape or for any other purposes.

A further feature of the invention is the provision of means for sounding an alarm to indicate the approach to certain points, such as villages, railroads, turns and the like, whereby it will not be necessary for the driver or operator to continually watch the tape. A further feature of the invention is the provision of means for causing the alarm to sound a predetermined distance before such points are reached, and a further feature of the invention is the provision of means in connection with the tape reversing mechanism for causing the alarm mechanism to coöperate with that side of the tape being used to indicate the route of travel.

Other objects and advantages will be hereinafter more fully set forth and pointed out in the accompanying specifications.

The nature of the invention will be more fully understood from the accompanying drawings, description and claims:

Figure 1 is a front elevation of the route indicating device ready to be applied to use. Fig. 2 is a side elevation thereof. Fig. 3 is a view similar to Fig. 2 with the hinged portion of the casing in open position. Fig. 4 is a plan view of a portion of the route indicating tape. Fig. 5 is a front elevation of the device showing a portion of the front cover broken away and parts thereof in section. Fig. 6 is a vertical sectional view as seen on line 6—6 of Fig. 5. Fig. 7 is a detail sectional view as seen on line 7—7 of Fig. 5 showing the parts of the circuit forming mechanism in neutral or inoperative position. Fig. 8 is a similar view showing the mechanism in position to form a circuit to operate the alarm signal. Fig. 9 is a sectional view as seen on line 9—9 of Fig. 6, showing the mechanism for controlling the movement of the tape in neutral or inoperative position, and Fig. 10 is a similar view showing the controlling mechanism in position to cause the tape to wind in one direction.

Referring to the drawings, in which similar reference numerals designate corresponding parts throughout the several views, 1 indicates a housing which is provided with a hinged section 2 whereby the hinged section may be swung to open position for gaining access to the interior of the housing, said hinged section having wings 3, which project to a point adjacent the rear wall of the housing and form part of the side walls thereof.

Mounted within the lower portion of the housing 1 is any suitable form of speedometer 4, the operating shaft 5 of which protrudes through the bottom of the housing and in position to be coupled to the usual form of flexible shaft, (not shown) used for operating speedometers.

Rotatably mounted within the housing 1 are winding shafts 6 and 7 which shafts have spools 8 and 9 mounted thereon upon which the ends of the tape 10 are wound, one end of the shafts having seats therein which engage studs 11 attached to one of the wings 3 of the hinged section 2, while the opposite ends of the shafts 6 and 7 are likewise provided with seats for engagement with pointed plungers 12 and by means of which the shafts and spools carried thereby are suspended within the housing.

The plungers 12 are longitudinally movable through thimbles 13 attached and projecting through one end wall of the housing, the plunger being held in engagement with the ends of the shafts by introducing a spiral spring 14 around each plunger and between the closed end of the thimble and a flange 15 on the plunger, the outer end of each plunger having a head 16 which may be grasped for drawing the plungers outwardly to disengage the pointed ends thereof from the shafts so that the shafts and spools carried thereby may be readily removed or reinserted to position.

The shafts 6 and 7 and spools 8 and 9 thereon are rotated in timed relation with the speedometer by extending one of the shafts 17 of the speedometer in position for causing the worm 18 carried thereby to engage a gear 19 on a shaft 20, said shaft 20 having a worm 21 for engagement with a worm gear 22, the worm gear 22 being mounted upon a shaft 23, mounted in a frame 24.

Attached to the shaft 23 and rotatable therewith is a gear 25 with which meshes a gear 26 mounted upon a shaft 27, said shaft 27 being likewise mounted in the frame 24. Also mounted upon the shaft 27 is a gear 28 with which meshes a shifting gear 29, said gear being fixed to the shaft 30 carried by one of the wings 3 of the housing 1, said shifting gear 29, when in mesh with the gear 28 also being in mesh with a gear 31 carried by the spool 9, thus imparting rotating motion to the spool 9 to wind the tape 10 thereon, from the shaft 17 on the speedometer 4.

In order to impart rotating motion to the spool 8 to wind the tape 10 thereon, a shaft 32 is mounted in the frame 24, on which is mounted a gear 33, said gear being connected to the gear 26 by means of an idler 34 which is positioned upon a shaft 35 between the gears 26 and 33. Coöperating with the gear 33 is a shifting gear 36 which is mounted upon a shaft 37, also carried by one of the wings 3 of the housing 1, said gear 36 being adapted to mesh with a gear 38 carried by the spool 8 and when the gear 36 is in mesh with the gears 33 and 38, the spool 8 will be rotated to wind the tape thereon.

The shafts 30 and 37 are longitudinally movable so that the gears 29 and 36 may be moved into or out of mesh with the gears 28 and 31, and 33 and 38 respectively, and in order to move said shafts, a rocking arm 39 is pivotally attached at its longitudinal center to a bracket 40, which bracket is in turn secured to the outer face of one of the wings 3. The ends of the rocking arm 39 are preferably bifurcated and engage notches 41 in the outer ends of the shafts so that by swinging the arm on its pivot, one of the shafts will be moved inwardly and the other drawn outwardly.

Any suitable means may be provided for holding the rocking arm in its adjusted position, but in the present instance a yielding knob 42 is attached to the rocking arm 39, said knob having a pin 43 which is adapted to engage notches 44 in the edge of the bracket 40, one notch being so positioned that when the pin is engaged therewith the rocking arm will move both of the shafts to neutral position, while by engaging the pin with one of the notches on opposite sides of the center notch, one of the shifting gears will be held in engagement with its coöperating gears and the other shifting gear out of engagement with its coöperating gears.

When the rocking arm 39 is swung to the position shown in Fig. 10, the gear 36 is in mesh with the gears 33 and 38, thereby imparting winding motion to the shaft 6 and spool 8, while the gear 29 will be out of mesh with the gears 28 and 31, thus leaving the spool 9 free to unwind by the pull of the tape thereon. The tape, when wound upon the spool 8, travels upwardly and parts thereof are exposed through an opening or visual space 45 in the front of the housing 1, and as the route directions are given at one side of the tape for traveling in one direction, and on the opposite side of the tape for traveling in the return direction, and as the tape is moving upwardly while being wound on the spool 8, the directions on the tape are to be read at the top edge of the opening 45, but on the return trip, owing to the fact that the tape is moving downwardly and being wound on the spool 9, the directions are to be read at the lower edge of the opening 45.

The tape 10 may have any form of printed instructions thereon, such as stations, turns, cross roads, bridges, railroad crossings, villages, hotels, garages, or in fact any instructions which are essential in touring over a road, and in order to obviate the necessity of the driver or operator continually watching the tape to keep advised when approaching certain points, especially danger points, an alarm mechanism is provided, which in this instance is shown as a bell 46, and in order to attract the attention of the driver or operator, and while a considerable distance from a railroad crossing, or other place where it is necessary to use extreme caution, means is provided for sounding the alarm, comprising a pair of contact plates 47 and 48, which are secured to the inner face of the front wall of the housing 1 and insulated therefrom, with which coöperate contact forming rollers 49 and 50 respectively. The contact rollers 49 and 50 are carried by a swinging bar 51 which is pivoted to a bracket 52 within the hinged portion of the housing 1 so that when one of the contact rollers is in position to engage its particular contact point the other roller will be moved away from its contact.

The tape 10 passes between the contact plates and the contact rollers, and normally breaks the circuit between the contact plates and rollers, but at the point where it is desired to sound an alarm an opening 53 is formed through the tape, thus permitting the rollers to engage with the contact plates when the opening 53 is brought into registration with the contact plates and rollers. There can be any number of the openings 53 and they are preferably positioned along the edges of the tape and are so arranged that an alarm will be sounded at least one-eighth of a mile before the danger point is reached, thus giving ample notice to the driver that he is approaching a point which requires special attention, and by glancing at the tape he can readily ascertain what is to be expected.

The bar 51 is rocked on its pivot to move one or the other of the contact rollers in position to engage its respective contact plate through the medium of a lever 54 which is pivoted adjacent its longitudinal center to one of the wings 3, the upper end of the lever being attached to one end of the bar 51 by a link 55, while the opposite end of the lever is provided with an elongated slot 56 which engages a pin 57 projecting inwardly from the rocking arm 39, so that when the rocking arm 39 is operated to move one or the other of the shifting gears into operative position, the bar 51 will be likewise rocked to bring the proper contact roller into position to engage its coöperative contact plate and as shown in Fig. 8, the roller 50 is moved into position to engage with contact plate 48, the position of these parts corresponding to the position of the parts shown in Fig. 10.

When it is desired to change the tape, as when the machine is traveling over a different route, the hinged section 2 is swung downwardly to the position shown in Fig. 3, and the plungers 12 drawn outwardly until the shafts 6 and 7 are released, when the spools and tape thereon are removed from the housing and the tape registering a different route placed in position to engage with the tapered studs and plungers carried by the housing.

This device can be very easily installed on a machine, as the same form of speedometer that is commonly used is placed in the housing and no parts thereof changed with the exception of the length of the shaft 17 and therefore in view of the fact that by placing the instructions for traveling in one direction between two points at one side of the tape and instructions for traveling in the opposite direction, or for the return trip on the opposite side of the tape, a routing of considerable distance may be made without employing a large amount of tape, the length of the tape also being kept at a minimum, by arranging the tape so that it will travel a distance of one inch, while the machine is traveling one mile.

This device is designed for use primarily with motor propelled vehicles such as automobiles, although it will be clearly understood that it can be applied to use in connection with any form of vehicle, motor boat, flying machine, railroad trains, street cars, or in fact any conveyance which may be used for travel from place to place over a prescribed route.

It will likewise be understood that instead of operating the tape winding gears from a speedometer that any suitable device which will operate the tape in timed relation with the speed of the travel of the vehicle may be used, as many structures may be provided which will accomplish the desired result. It will further be understood that when the indicator is used in connection with railway trains, interurbans or street cars, that the alarm can be so arranged as to sound a predetermined distance before the next succeeding street is reached and coincident to the sounding of the alarm the name of the cross-street, station or stop being approached will be brought into registration with the opening in the housing of the indicator.

The invention claimed is:—

1. In a route indicator, the combination with a pair of spools, a gear on each spool, and a tape adapted to be wound upon one or the other of said spools, of a shifting gear slidable in a horizontal plane axially of said spools adapted to coöperate with each gear of the spools, a means to simultaneously operate said shifting gears to move one toward its coöperating gear and the other away from its coöperating gear, and a common driving means for both of the shifting gears.

2. In a route indicator, the combination with a pair of spools, a tape connected to said spools, and a winding gear carried by each spool, of a shifting gear horizontally slidable axially of said spools for coöperation with each winding gear, a driving gear for each shifting gear, a common means for driving the last gears, and means to simultaneously operate the shifting gears whereby one of the shifting gears will be moved into mesh with and between its respective winding gear and driving gear, and the other shifting gear moved out of mesh with its respective winding gear and driving gear.

3. In a route indicator, the combination with a pair of spools, a tape coöperating therewith, and winding gears attached to said spools, of a pair of slidably mounted shifting gears for coöperation with the winding gears, a train of gears, means to drive the train of gears in one direction, and means to slide said shifting gears inwardly or outwardly in alinement with the axes of said spools whereby the movement of the tape may be reversed without changing the direction of rotation of the train of gears.

4. In a route indicator, the combination with a pair of spools, a winding gear on each spool and a tape coöperating with said spools, of a slidably mounted shifting gear for coöperation with each winding gear, a driving gear coöperating with each shifting gear, a common means for driving both of the driving gears, and a pivotally mounted rocking lever between said shifting gears and connected therewith, whereby both of said shifting gears may be moved out of engagement with their respective driving gears and winding gears, or one of the shifting gears positioned between and in engagement with its respective winding gear and driving gear, and the other shifting gear moved from between and out of engagement with its respective winding gear and driving gear.

5. In a route indicator, a housing having a hinged section, a pair of shafts pivotally and removably attached to and supported solely by said hinged section, spools carried by said shafts, a tape adapted to wind on said spools, and means for rotating said spools, said shafts, spools and tape being bodily movable with said hinged section.

6. In a route indicator, the combination with a movable tape having perforations along each edge thereof, of a stationary contact point at one side of said tape, movable contact points at the opposite side thereof and in alinement with said openings, and means to rock said movable contact points whereby the movable contact at one edge of the tape may be moved into operative position and the contact at the other edge of the tape removed from operative position.

7. In a route indicator, the combination with a movable tape having perforations adjacent each edge thereof, spools carrying said tape, gears on said spools, shifting gears coöperating with the first gears, and means to operate the shifting gears to reverse the rotation of the tape, of a stationary contact on one side of the tape, movable contacts on the opposite side of the tape adapted to register with the openings in the tape to form a circuit, and means operable by the gear shifting mechanism to move one of said movable contacts into operative position and the other contact out of operative position.

8. In a route indicator for vehicles, the combination with a tape having directions thereon in duplicate columns and in reverse order, means to move said tape lengthwise, and means to reverse the movement of said tape, of an alarm mechanism, contact forming means coöperating with said tape, and means for shifting said contact mechanism coincident to the changing of the direction of travel of the tape.

9. In a route indicator, the combination with a pair of spools, a gear on each spool, and a tape adapted to be wound upon one or the other of said spools, of a driving gear spaced a distance from each gear on the spools and in vertical alinement therewith, a shift gear horizontally slidable axially of the spool adapted to pass between the driving gear and spool gear, and means for simultaneously moving said shifting gears in opposite directions, whereby one of the shifting gears will be moved between and in mesh with its respective driving gear and spool gear and the other shift gear from between and out of mesh with its respective driving gear and spool gear.

10. In a route indicator, the combination with a pair of spools, a gear at one end of each spool, and a tape adapted to be wound upon one or the other of said spools, of a shifting gear for each spool, a horizontally slidable shaft to which each shifting gear is attached, a driving gear below and in alinement with each spool gear and a horizontally slidable rocking lever attached to said shafts adapted to move one of the shafts and shifting gear thereon to position between one of the driving gears, and its coöperating spool gear, and the other shifting gear out of position between its respective driving gear and spool gear when said lever is rocked on its pivot whereby the action of the tape will be changed.

11. A route indicator, including a housing, a pair of rotatable spools in said housing, a tape adapted to be wound on one or the other of said spools, a gear at one end of each spool, a driving gear in line with and a distance below the spool gears, a pair of shafts slidably mounted between the driving gears and the spool gears and projecting through one wall of the housing, a shifting gear fastened to each shaft, a rocking lever pivotally attached to the outer face of the housing adapted to engage the projecting ends of said shafts to move the gears into or out of mesh with the driving gears and spool gears when said lever is rocked upon its pivot.

12. In a route indicator, a housing having a hinged portion, inwardly extending wings on said hinged portion, a pair of shafts pivoted to and between said wings and carried inwardly and outwardly with said hinged portion when the hinged portion is moved to closed or open position, spools carried by said shafts, a tape adapted to wind on said spools, and means for rotating said shafts and spools.

In witness whereof, we have hereunto affixed our signatures.

WILLIAM F. BRIEN.
MARVIN H. WHITTAKER.